Figure 1:
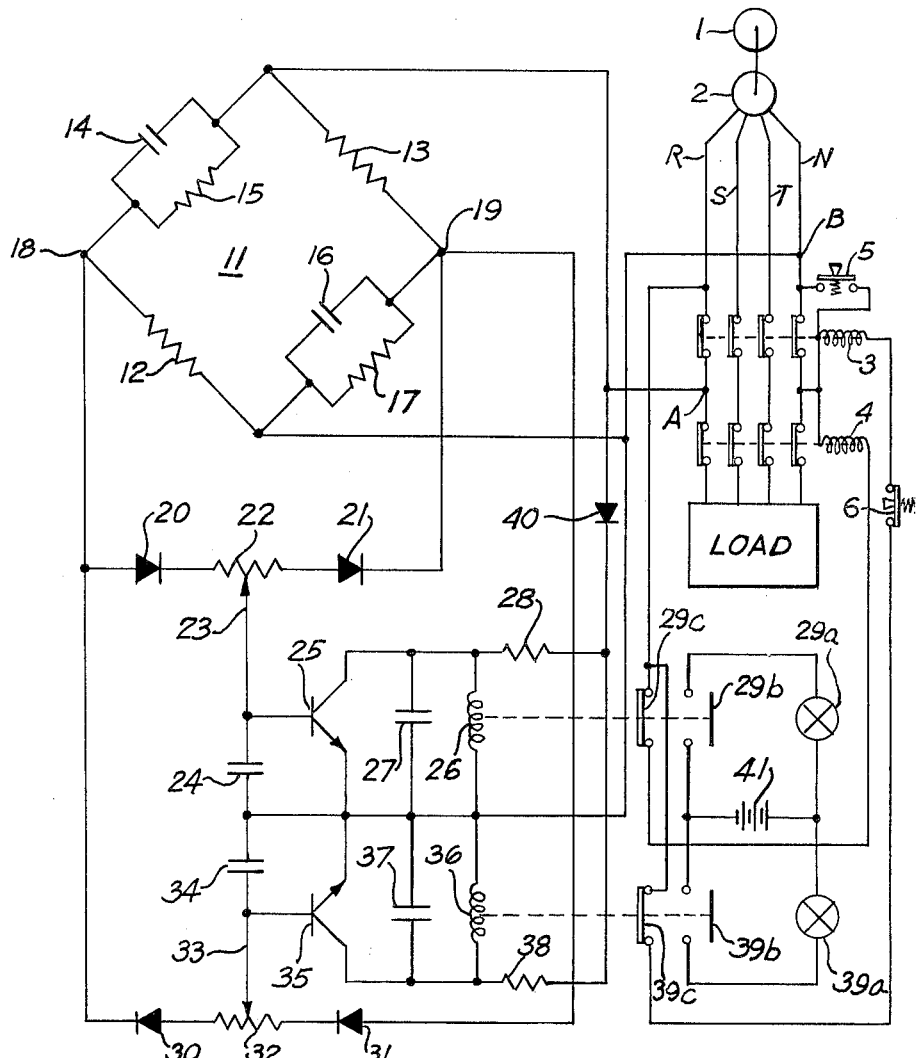

April 5, 1966    A. B. BLACKBURN    3,244,937
ELECTRONIC FREQUENCY ERROR DETECTOR
Original Filed Sept. 26, 1962

INVENTOR
ALAN BLACKBURN
BY Toulmin & Toulmin
ATTORNEYS

United States Patent Office 3,244,937
Patented Apr. 5, 1966

3,244,937
ELECTRONIC FREQUENCY ERROR DETECTOR
Alan B. Blackburn, Troy, Ohio, assignor to Hobart Brothers Company, Troy, Ohio, a corporation of Ohio
Continuation of application Ser. No. 226,209, Sept. 26, 1962. This application Oct. 8, 1965, Ser. No. 493,997
2 Claims. (Cl. 317—9)

This application is a continuation of Serial No. 226,209, filed September 26, 1962, and now abandoned.

The present invention relates to an electronic frequency error detector.

It is the primary object of the present invention to devise a new and improved frequency error detector which can be used atlernatively as over- and under-frequency detector.

It is an object of the present invention to provide a frequency error detector with remote control and signalling.

It is another object of the present invention to provide a novel, miniaturized frequency error detector responding to ±1% frequency variation while using a simple control and/or signalling relay.

It is a further object of the present invention to provide a novel frequency error detector with an adjustable range of tolerance.

It is still a further object of the present invention to provide a new frequency error detector which permits installation to a given power line of any voltage within a wide range without requiring special prior adaptation.

According to one aspect of the present invention in a preferred embodiment thereof, it is suggested to provide an impedance bridge in which there are opposite branches of similar and adjacent branches of dissimilar type; two branches may comprise ohmic resistors and the other two branches capacitors, with respectively shunted resistors to reduce the effect of power line harmonics. The main input terminals of this bridge are connected or connectable to the line, the frequency of which is to be supervised. The output diagonal of the bridge is interconnected by a series circuit connection comprising, in succession, a diode, a potentiometer and another diode poled for similar current direction. The tap or slider of the potentiometer and one main bridge terminal are interconnected by the base emitter path of a transistor. The transistor controls the current through a relay coil, preferably being shunted across the emitter-collector path of the transistor. The relay governs the current supply to a signalling device, for example, a lamp.

Figure 2:
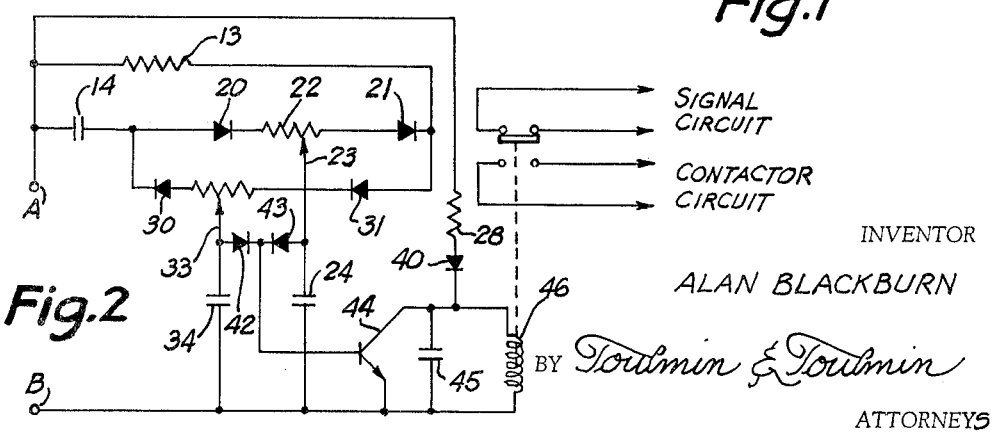

The objects and features of the invention will be better understood from the following description of the drawing in which:

FIG. 1 illustrates a schematic circuit diagram of a frequency error detector with signalling device in accordance with an embodiment of the present invention; and FIG. 2 illustrates a modified device as compared with that illustrated in FIG. 1 for over and under-frequency detection.

In FIG. 1 there is first shown a prime mover 1, for example, an internal combustion engine or an electric motor, driving a 400 c.p.s.-four wire generator 2. There are three phase lines R, S, T, and a neutral line N connecting generator 2 to a load.

It should be mentioned that the electric generator and the motor type are not important; however, the invention finds best utility in case of a combustion engine since here it is more likely that frequency deviations will occur. Of course, the generator has to be an A.C. generator since the invention is related to frequency error detection, but the phase type of the power line to be supervised is not important.

There are two sensing terminals A and B connected and pertaining to lines R and N, respectively, to which sensing terminals there is connected the frequency detector to be described below.

Two main circuit breakers, 3 and 4 are provided to make and break contact in the feeder lines N, R, S, T leading to the load.

It can be seen from the drawing that terminal B is not governed by any of the contacts of circuit breakers 3 and 4 so that the detector circuit to be described below is always connected to line N which preferably is connected to ground.

Sensing terminal A is governed by a contact blade of circuit breaker 3, but not by circuit breaker 4. The energizing coil of circuit breaker 3 is connected to line N behind its associated contact for this line, while the energizing coil of circuit breaker 4 is connected ahead of its contact thus governing the connection of line N to the load. Both circuit breakers are connected to line R at the generator. There is a normally open starter switch 5 for connecting temporarily the coil of circuit breaker 3 to line N at the generator. There is a normally closed off switch 6 in the return in the return line of the coil of circuit breaker 3 to line R.

Both the circuit breakers 3 and 4 have individual control circuits governed by the detector circuit connected across terminals A and B. To these terminals A and B is connected a phase-bridge 11 having two ohmic resistance branches 12 and 13 and two predominantly capacitive branches with capacitors 14 and 16 and parallel resistors 15 and 17, respectively. The voltages taken from diagonal terminals 18 and 19 are alternating voltages, taken, for example, with respect to terminal B. A rectifier diode 20 is connected to terminal 18, and a rectifier diode 21 is connected to terminal 19. These diodes rectify the respective voltages at these diagonal terminals; thus, at the respective diode electrodes not connected to any bridge terminal, pulsating D.C. voltages appear, which voltage pulses are successively of opposite polarity.

The diodes are interconnected by a potentiometer 22 having an adjustable slider 23. This potentiometer 22 acts as summing member for the two pulsating D.C. voltages, one being taken between and from terminal 18 and terminal B, via diode rectifier 20, and the other one is taken from terminals 19 via diode rectifier 21. The slider 23 is connected to terminal N by means of a filtering capacitor 24.

If slider 23 is in its central position, the pulsating D.C. voltage across the left hand portion of the potentiometer equals the pulsating D.C. voltage across the right hand portion thereof, but is of opposite polarity, so the relative potential difference between slider 23 and terminal B is zero, provided that, during operation, the amplitude of the A.C. voltage drop across resistor 12 equals the amplitude of the A.C. voltage drop across capacitor 16 (i.e. the voltage across capacitor 14 equals that across resistor 13). Bridge 11 is selected so that at the desired frequency these operating conditions are present indeed. The capacitive connection of slider 23 and terminal B does not alter this mode of operation since the capacitor 24 is effective in both diode branches, each one taken between slider 23 and one of the bridge diagonal terminals. It is understood, of course, that the transistor itself provides a resistance path paralleling capacitor 24. If slider 23 is shifted from its central position to the right, the potential thereof will be negative with respect to that of terminal B; if slider 23 is shifted to the left, there will be a positive voltage between slider 23 and terminal B.

From the foregoing, it will be appreciated that bridge 11 was assumed to have similar resistive branches (12 and 13) and similar capacitive branches (14, 15 and 16, 17), and that at a given frequency the voltage drop across all branches is similar. This similarity is reasonable from the standpoint of facilitating the organization of the device and the understanding of the invention, but such similarity is not essential. The effective impedance (Z) in ohms of the branch consisting of elements 16 and 17 will not be similar to that of the resistance 12 at a deviation from a given frequency. In view of the fact that slider 23 can be adjusted at will, one will be able to always find a position of slider 23 in which its potential is that of terminal B. Of course, with a bridge having similar resistive and similar capacitive branches, there will be no basic wave (a zero-harmonic) appearing between slider 23 and terminal B, and thus, capacitor 24 has to filter only the ripples caused by higher harmonics, at the adjusted neutral position of slider 23. No fundamental frequency will appear at 23 anyway due to the action of rectifiers 20 and 21. In case of proper circuit symmetry and sine wave voltage of proper frequency between A and N, the voltage pulses will cancel at slider 23. However, when the frequency changes the voltages will not cancel but the pulsating voltages will not effect the average collector current of the transistor; the capacitor 24 charges to very nearly the peak value of the pulse difference causing a definite D.C. level to be impressed on the transistor base, which then has an effect on collector current.

Continuing now with the description of the figure, the voltage between slider 23 and terminal B is supplied to the base-emitter path of a NPN-transistor 25, being connected accordingly, and appearing in common emitter configuration. A relay coil 26 is connected across emitter and collector electrodes of transistor 25 and controlled therewith. A capacitor 27 is connected across relay coil 26 to reduce chattering of the relay. A blade 29b is controlled by coil 26. Blade 29b governs the current supply from a suitable voltage source 41 to a signalling lamp 29a. The signalling and control relay having coil 26 has a second blade 29c governing the current supply to circuit breaker 4. The collector of transistor 25 is connected via a collector resistor 28 and a diode 40 to terminal A, thus being biased with the voltage potential derived therefrom. Elements 20 to 29 and 29b constitute a signalling circuit responding, as will be explained more fully below, to a frequency deviation below the desired frequency. The contact blade 29c in conjunction with circuit breaker 4 completes this signalling circuit to a control circuit responding in case of an under frequency. The FIGURE 1 shows, furthermore, elements 30 to 39 and 39b, respectively, corresponding to elements 20 to 29 and 29b and the former elements are connected in similar circuit connection as the latter, with the sole, but important, exception for a reversal of the direction of conduction of diodes 30 and 31, as compared with that of diodes 29 and 21. For reasons of a simplified design, preferably corresponding elements are not only similar in character and type but also in their dimensions. The group including elements 20 to 29 and 29b serve for detecting and signalling under-frequency and, as will also be explained below, the group comprising elements 30 to 39 and 39b serves to detect and signal over-frequency. Both groups of elements operate independently, but, of course, with mutually exclusive response to a frequency deviation. Over-frequency signalling system 30 to 39b is supplemented by a control blade 39c likewise controlled by relay coil 36 and governing the current supply to circuit breaker 3.

For the operation of the invention it is necessary only that at least one group of elements as present, since in cases one might be interested in either under-frequency or over-frequency only.

The device as described thus far operates as follows:
When starter switch 5 is open, the off-switch 6 was previously opened, circuit breakers 3 and 4 are unenergized which means that their associated contacts are open. Throughout the detector circuit ground potential will prevail.

Setting the device into operation, switch 5 is closed thus causing circuit breaker 3 to respond since unenergized relay 36 keeps blade 29c normally closed. It might be advisable to have blades inserted into the energizing circuits of relays 26 and 36 so that during the starting operation, the detector circuit is given time to establish stationary operating conditions, so as to prevent any of the relays 26 and 36 from responding before transistors 25 and 35 are rendered conductive.

After response of circuit breaker 3, circuit breaker 4 likewise responds and upon release of switch 5 the two circuit breakers remain energized keeping their contacts closed.

If the voltage at terminals A and B has the correct frequency, the D.C. voltages derived from bridge 11 by rectifiers 20 and 30 equal the voltages derived from the bridge by rectifiers 21 and 31. The sliders 23 and 33 are adjusted so that they have a slightly positive D.C. potential as compared with that of terminal B. Capacitors 24 and 34 remove the pulsations and ripples of this potential. The positive potentials of the sliders respectively base bias transistors 25 and 35 to conduction, and the remaining current through the two coils 26 and 36 is insufficient to energize the respective relays. Accordingly, blades 29b and 39b are open and lamps 29a and 39a are dark, indicating that there is correct frequency in the lines of the terminals A and N. Blades 29c and 39c are closed causing the circuit breakers to keep their contacts closed.

If the frequency of the voltage at terminals A and B now decreases, the voltages across capacitors 14 and 16 increases, and the voltages across resistors 12 and 13 will decreae thus altering the balance of the bridge and decreasing the voltage potential of slider 23. Dependent upon prior adjustment of slider 23, at a thus given frequency deviation, the potential at slider 23 will cause transistor 25 to be shifted to cut-off, thus acting as extremely high impedance and permitting increased current conduction through coil 26. Hence, this signalling and control relay will respond and close its blades 29b so that signalling lamp 29a can light up. Upon response of this relay, blade 29c is opened, interrupting the energizing circuit for circuit breaker 4 which opens its contacts. This circuit breaking is neither effective for circuit breaker 3 nor for the detector circuit, particularly the potentials at the sensing terminals A and B thereof. Thus, the sensing of the output frequency of generator 2 continues.

With regard to transistor 35 its positive base bias was increased with decreasing frequency, thus increasing the collector current, and relay coil 36 will not become energized.

When the frequency increases again, the bias of the base electrode of transistor 25 is shifted towards more positive values until resistor 25 is rendered conductive again and the relay with coil 26 is deenergized so that lamp 29a is turned off again.

Simultaneously, blade 29c closes the energizing circuit for circuit breaker 4, its contacts close and normal operation is resumed. This is carried out fully automatic. Upon a further frequency increase, transistor 25 remains conductive and coil 26 remains deenergized so that lamp 29a remains dark.

The frequency increase now under consideration causes the voltages across resistors 12 and 13 to increase and the voltages across capacitors 14 and 16 to decrease. Accordingly, the voltage potential of slider 33 is shifted towards negative values, and, dependent upon the particular adjustment of slider 33, transistor 35 will be cut off at a given frequency deviation, so that relay coil 36 will be energized and signalling lamp 39a is lit up thus indicating the occurrence of an over-frequency at terminals A and B. Simultaneously, blade 39c opens, interrupting the energizing circuit for circuit breaker 3 so that its contacts open. This has the effect of taking the potential at A away from the detector, and the contact blade of circuit breaker 3 governing line N operates to retain the unenergized condition for circuit breaker 3 regardless of the position of blade 39c. Thus, in this instance, there will be no automatic resuming of normal operation, but starter switch 5 has to be pushed again. The fact that circuit breaker 4 dropped simultaneously with circuit breaker 3 serves as additional safeguard. The purpose of this arrangement is that over-frequency usually is very dangerous for equipment, more than is under-frequency. Thus, resuming of operation is not possible, even accidentally, until personnel have checked on the cause of the over-frequency and made the necessary repairs or adjustments etc.

The circuit network as described illustartes the principle behind this specific embodiment of the invention. The bridge 11 together with any of the diode-potentiometer circuits (20, 21, 22 or 30, 31, 32) provide for an adjustable D.C. potential at the respective potentiometer slider so that there is an adjustable positive or negative to any one of the main bridge terminals (or power lines). Such potential depends upon the line frequency. For any particular frequency within a certain range one can find an adjustment position of the potentiometer slider (neutral or zero position) so that there is no potential difference between this slider and one of the main bridge terminals (here B).

Upon calibration for a predetermined frequency, such neutral potentiometer-slider position can be predetermined and defined as being associated to such frequency. Starting out from such a position, one then can shift the potentiometer slider to another position so that there is a particular and predetermined voltage between the slider and the main bridge terminal under consideration still taken at such predetermined and unaltered frequency. This voltage determines the range of tolerance. One then has to connect the emitter-base path of a transistor between slider and main terminal so that the transistor is cut off (or conductive). If now the frequency varies so that this voltage between slider and main terminal decreases towards zero (the slider remaining in position), the transistor will be rendered conductive (or cut off); no change in conductivity (except in degree) of the transistor occurs if the frequency has varied in opposite direction so as to increase the voltage between slider and terminal.

From the foregoing it can be derived that the embodiment shown is susceptible to several specific modifications. Taken in connection with the bridge 11, the group of elements 20 to 28 or 30 to 38 provides for a control circuit in which the respective relay is energized, and the associated transistor is cut off in one range of frequency, and in which this relay is deenergized with the transistor being conductive in the adjacent frequency range whereby adjustment of the slider (23 or 33) of the associated potentiometer shifts the margin or border between the two frequency ranges. Whether the frequency range in which the respective relay is energized (and the transistor is cut off) is the, relatively speaking, high frequency range or the low frequency range depends solely upon the polarity of connecting the diodes (20, 21 or 30, 31) into the circuit. The relays respectively having coil 26 and 36 can be devised as having operating contacts (as is shown) or they may have open-circuit or resting contacts. In this case, lamp 29a when lit up, will actually indicate over-frequency, and lamp 39a under-frequency, and the connections to circuit breakers 3 and 4 will be reversed. With a given bridge 11, the position of slider 23 or 33 determines the tolerance of frequency deviations from the normal or desired frequency. It is not necessary to have this range of tolerance for negative deviations similar in size to the range of tolerance for positive deviations from normal, i.e. these tolerance ranges are individually adjustable.

Another possible modification is to have any of the circuit breakers controlling the ignition circuit if 1 is an internal combustion engine. In this case, the control effect would affect the prime mover rather than the generator-load circuit.

The capacitors 14 and 16 may be substituted by reactance coils, and in this case, the change in voltage with changing frequency is oppositely directed as compared with that of the bridge illustrated. It is also possible to have reactance coils instead of ohmic resistors 12 and 13, provided there is no resonance or anti-resonance in the range of frequencies in which occur the normal frequency and possible deviations therefrom.

It is further possible to use PNP transistors in which case, as compared with the one illustrated, the frequency range causing transistor conduction and the frequency range causing cut off will be exchanged. Of course, if the mode of operation as far as signalling is concerned is used as described in connection with the drawings, slider 23 then must be adjusted to normally bias the base electrode of the then associated PNP transistor with a positive voltage.

It is furthermore possible to have the elements 20 to 29 and 29a, 39 and 39a connected as illustrated while elements 30 to 38 are connected so that one side of capacitors 34 and 37 of coil 36 and the emitter of transistor 35 are connected to terminal A, while the collector resistor 38 of transistor 35 is connected to terminal N via an additional diode.

In addition to the signalling lamps illustrated or in lieu thereof, they may be provided audible signalling means of known design.

FIGURE 2 illustrates a modification and simplification of FIGURE 1, using but one transistor and signalling relay and half the sensing bridge.

In operation, two charging paths are supplied for capacitors 24 and 34, one predominately capacitive through capacitor 14, the other predominately resistive through resistor 13. Capacitors 24 and 34 are so large compared to capacitor 14 that they have little effect on the impedance of the circuit. This allows alternate positive and negative pulses to charge capacitors 24 and 34 through diodes 20, 21, 30, 31, and potentiometers 22 and 32. It can be seen that, with proper selection of components, adjustment of potentiometers and correct voltage and frequency applied, there will be no net charge on capacitors 24 and 34 as the impedance of the resistive (chiefly resistor 13) and capacitive (chiefly capacitor 14) branches will be equal.

If the frequency were to be raised, positive pulses on capacitor 24 would be larger than the negative and a net positive voltage would be apparent across capacitor 24 (with respect to terminal B). This would allow conduction of diode 42, with resultant change in base bias of transistor 44, causing it to conduct and reduce the current through the coil of relay 46, with subsequent closure of its normally closed contacts to signal a frequency error.

If the frequency were to return to normal, the bias on the base of transistor 44 would reduce allowing the transistor to cut off and the relay coil 46 would then have sufficient current through it to attract the armature and open the normally closed contact to signal correct frequency.

In the case of reducing the frequency, essentially the same thing happens only involving potentiometer 32, capacitor 34, and diode 43.

The invention is not limited to the embodiments described above but all changes and modifications thereof not constituting departure from the spirit and scope of the invention are intended to be covered by the following claims.

I claim:
1. An electronic frequency error detector for control- ling the output circuit of an A.C. power supply in response to the frequency of said power supply, said error detector comprising a first frequency sensitive, adjustable circuit means operably connected to said power supply for providing an output signal when the frequency of said power supply is below a predetermined lower limit, a second frequency sensitive, adjustable circuit means operably connected to said power supply for providing an output signal when the frequency of said power supply is above a predetermined upper limit, a first control circuit means in said A.C. power supply circuit operable in response to the output of said first frequency sensitive means to open said power supply circuit when the frequency of said power supply decreases below said predetermined lower limit, a second control circuit means in said A.C. power supply circuit operable in response to the output of said second frequency sensitive means to open said power supply circuit when the frequency of said power supply increases above a predetermined upper limit, and a holding circuit completed through said second control circuit means to enable said first and second control circuit means during periods when the frequency of said power supply is below said predetermined upper limit and to disable said control circuit means and said holding circuit when the frequency of said power supply increases above said predetermined upper limit thereby preventing an output from said A.C. power supply after the frequency of said power supply increases about said predetermined upper limit until such holding circuit is manually restored.

2. The electronic frequency error detector as defined in claim 1 wherein said first control circuit means disables the output of said A.C. power supply only during periods when the frequency of said power supply is below said predetermined lower limit and automatically enables the output of said A.C. power supply when the frequency is above said predetermined lower limit.

No references cited.

NEIL C. READ, *Primary Examiner.*

D. K. MYER, *Assistant Examiner.*